United States Patent
Rivola et al.

(10) Patent No.: US 11,267,597 B2
(45) Date of Patent: Mar. 8, 2022

(54) MACHINE FOR FORMING FILTER BAGS FOR INFUSION PRODUCTS

(71) Applicant: I.M.A. Industria Macchine Automatiche S.p.A., Ozzano Dell'Emilia (IT)

(72) Inventors: Sauro Rivola, Ozzano Dell'Emilia (IT); Manuel Buscaroli, Ozzano Dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 32 days.

(21) Appl. No.: 16/643,802

(22) PCT Filed: Sep. 3, 2018

(86) PCT No.: PCT/IB2018/056705
§ 371 (c)(1),
(2) Date: Mar. 2, 2020

(87) PCT Pub. No.: WO2019/049017
PCT Pub. Date: Mar. 14, 2019

(65) Prior Publication Data
US 2020/0216205 A1    Jul. 9, 2020

(30) Foreign Application Priority Data

Sep. 6, 2017    (IT) .................. 102017000099539

(51) Int. Cl.
*B65B 29/04*    (2006.01)
*B65B 29/02*    (2006.01)
(Continued)

(52) U.S. Cl.
CPC ............ *B65B 29/028* (2017.08); *B65B 29/04* (2013.01); *B29C 66/1122* (2013.01);
(Continued)

(58) Field of Classification Search
CPC ....... B65B 29/00; B65B 29/02; B65B 29/022; B65B 29/028; B65B 29/04; B65D 85/808; B29L 2031/7122
See application file for complete search history.

(56) References Cited

U.S. PATENT DOCUMENTS

| 3,969,873 A * | 7/1976 | Klar ................. B65B 29/04 53/134.2 |
| 5,871,789 A * | 2/1999 | Romagnoli ........ B65B 29/04 426/77 |
| 2020/0317379 A1* | 10/2020 | Rivola ............. B65B 29/028 |

FOREIGN PATENT DOCUMENTS

| CN | 1362924 A | 8/2002 |
| CN | 1483645 A | 3/2004 |

(Continued)

OTHER PUBLICATIONS

Chinese Office Action issued by the Chinese Patent Office from corresponding Chinses Patent Application No. 2018800576224.
International Search Report and Written Opinion dated Jan. 3, 2019 for counterpart International Patent Application No. PCT/IB2018/056705.

*Primary Examiner* — Chelsea E Stinson
(74) *Attorney, Agent, or Firm* — Shuttleworth & Ingersoll, PLC; Timothy Klima

(57) ABSTRACT

A machine for forming filter bags for infusion products includes a first carousel including a plurality of first stations for operating on pieces of filtering material. A transfer device transfers the pieces to a second carousel. The transfer device includes a first wheel, rotatable parallel to the carousels, and including units for receiving from the first stations and releasing to the second carousel, the pieces. Each receiving unit includes 1) first gripping and stabilising devices for retaining the pieces upright and positioned with a free head end directed towards the axis of the first wheel and 2) second gripping devices for positioning and retaining a tag on the piece, fed from a corresponding feeding station, (Continued)

to release to the second carousel the piece with a corresponding tag alongside the free head end of the piece.

15 Claims, 11 Drawing Sheets

(51) Int. Cl.
*B29C 65/00* (2006.01)
*B29L 31/00* (2006.01)
*B65D 85/808* (2006.01)

(52) U.S. Cl.
CPC ..... *B29L 2031/7122* (2013.01); *B65B 29/022* (2017.08); *B65D 85/808* (2013.01)

(56) References Cited

FOREIGN PATENT DOCUMENTS

| | | | |
|---|---|---|---|
| CN | 101016089 A | 8/2007 | |
| CN | 101970300 A | 2/2011 | |
| DE | 69606943 D1 | 4/2000 | |
| EP | 762973 A1 | 3/1997 | |
| EP | 762974 A1 | 3/1997 | |
| EP | 765274 A1 | 4/1997 | |
| IT | 1336837 | 12/2006 | |
| WO | 9631395 A1 | 10/1996 | |
| WO | 0017055 A2 | 3/2000 | |
| WO | 2017145044 A1 | 8/2017 | |
| WO | WO-2017145044 A1 * | 8/2017 | ............. B65B 29/04 |

\* cited by examiner

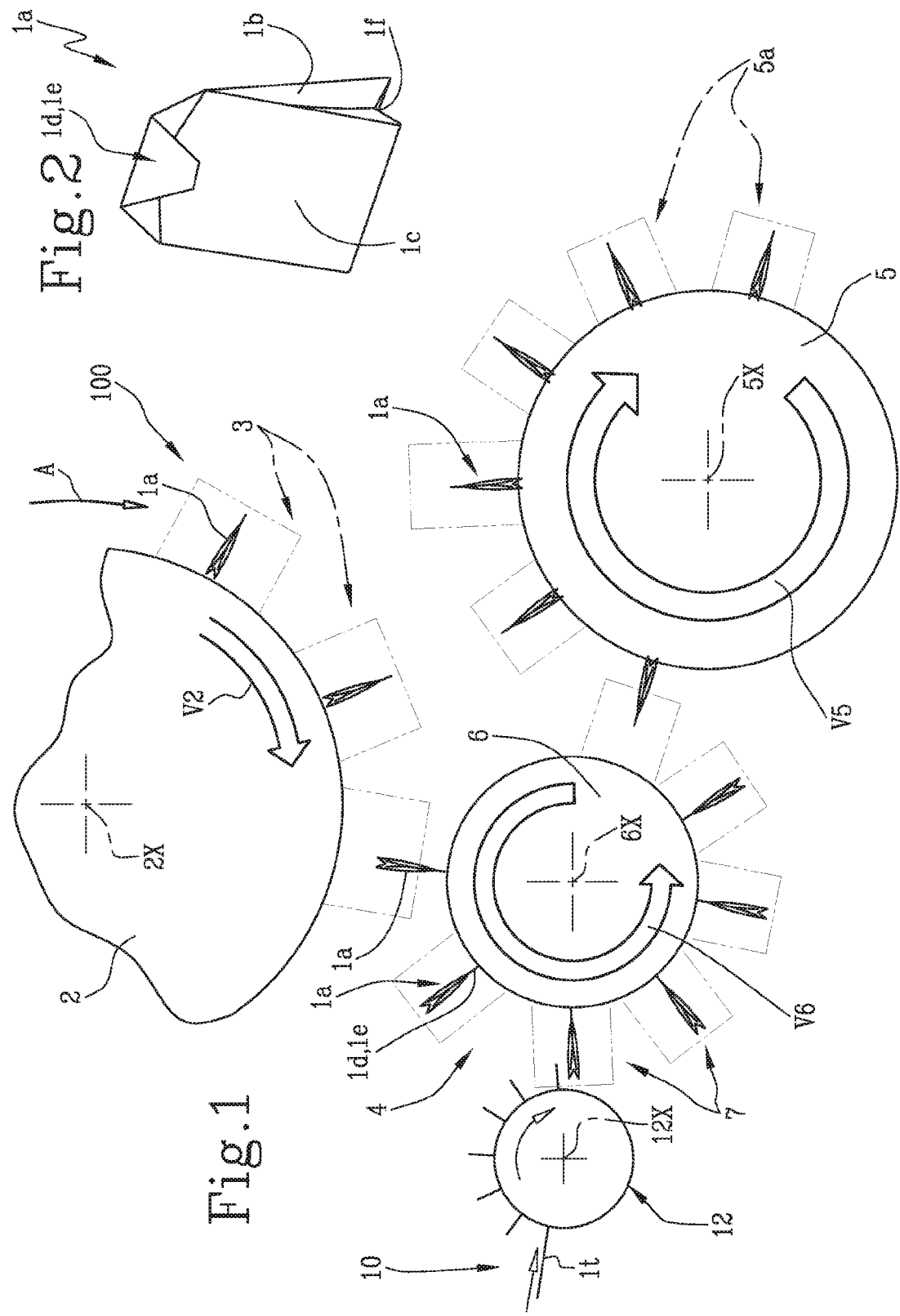

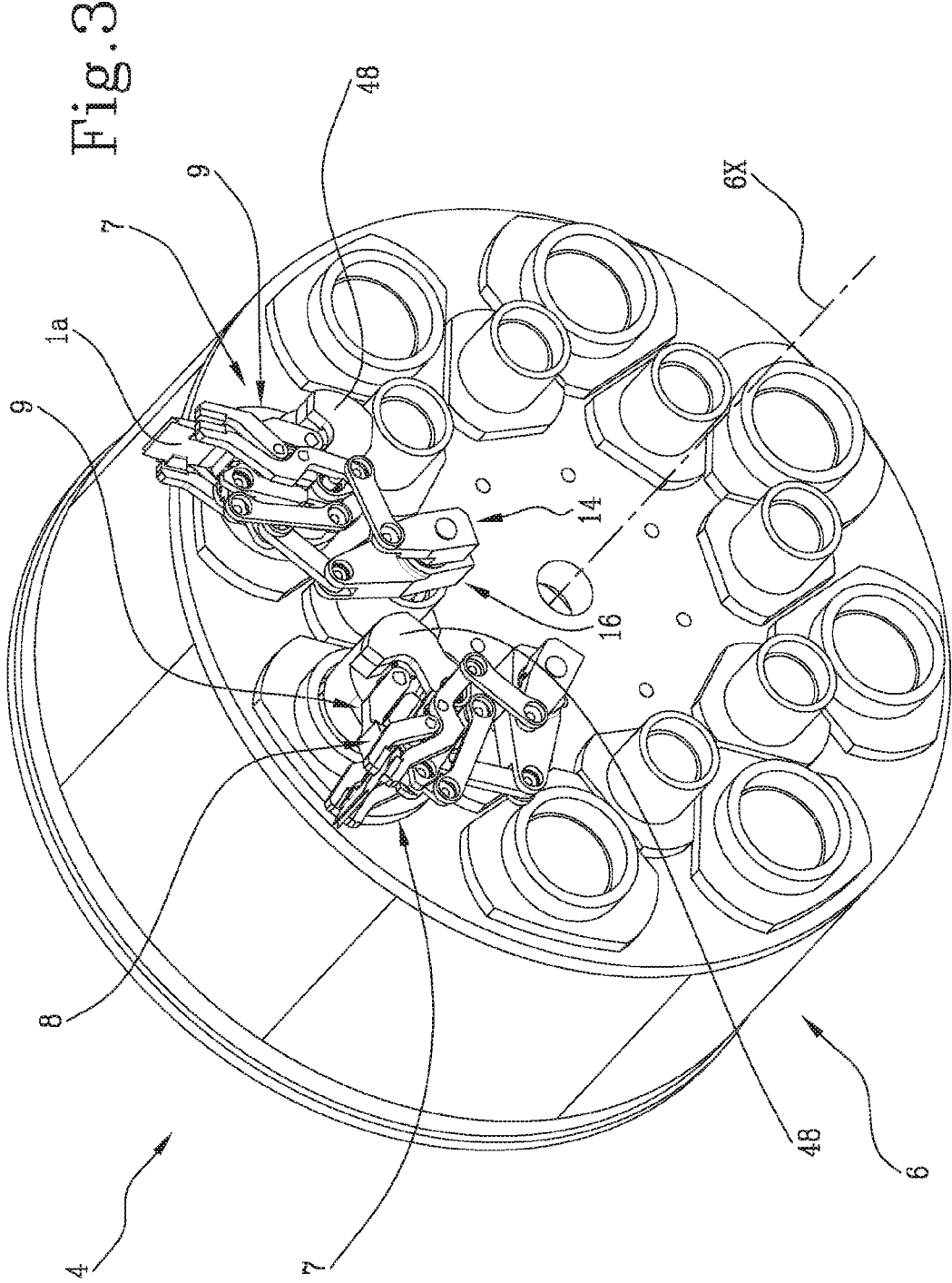

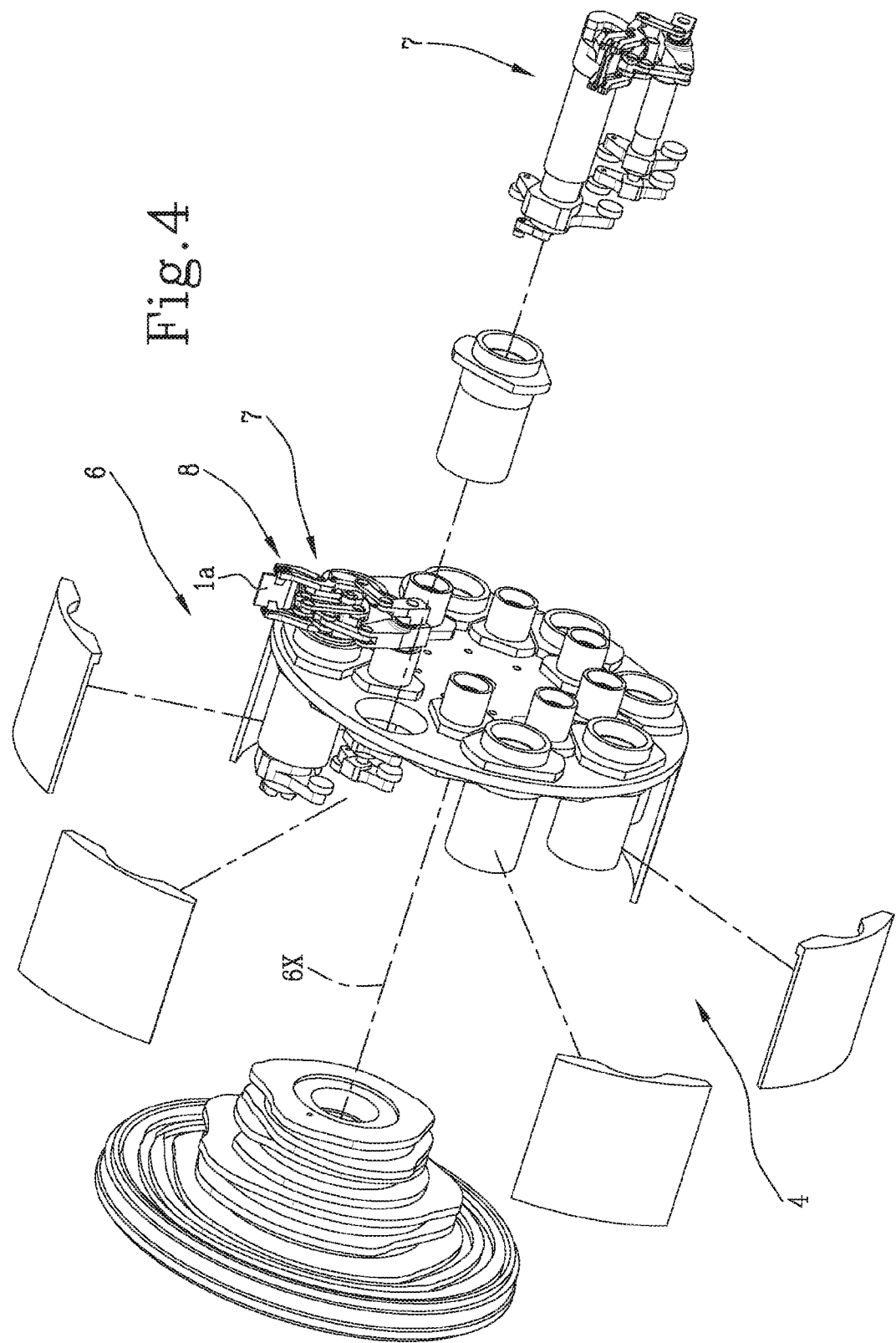

MACHINE FOR FORMING FILTER BAGS FOR INFUSION PRODUCTS

This application is the National Phase of International Application PCT/I62018/056705 filed Sep. 3, 2018 which designated the U.S.

This application claims priority to Italian Patent Application No. IT102017000099539 filed Sep. 6, 2017, which application is incorporated by reference herein.

TECHNICAL FIELD

This invention relates to a machine for forming filter bags for infusion products, such as tea, coffee, camomile (in powder, granular or leaf form).

BACKGROUND ART

The term filter bags is used to indicate at least two types of filter bag: the single-chamber filter bags, comprising, in a minimum configuration, a piece of filtering material forming a chamber containing a dose of infusion product; and the double-chamber filter bags, again comprising a single piece of filter paper, but forming two separate chambers. Each chamber contains a dose of infusion product. The two chambers are folded towards each other forming a single upper end (in the shape of an upturned "V") and a bottom end in the shape of a "W".

The single-chamber and double-chamber filter bags can also be equipped with a tag and a tie string connecting the tag to the filter bag.

Lastly, an overwrap envelope may be added to the above mentioned filter bags for wrapping and closing the single filter bag, in a hermetic or non-hermetic manner.

A type of machine, used for making filter bags of the type called two-lobed, is known from patent documents EP762973, EP762974 and EP765274 (all in the name of the same Applicant).

The machine extends along a forming and feeding line on which are positioned:
- a station for feeding a web of filtering material along a feed surface;
- a station for feeding doses of product on the web of filtering material at predetermined distances;
- a tabularisation station for folding the strip on itself, wrapping the doses of product and, subsequently, longitudinally joining the strip;
- a station for folding individual pieces of filtering material with double chamber;
- a carousel, equipped with radially protruding grippers, positioned beneath the folding station and configured to receive individual pieces of folded filtering material; the carousel, moved stepwise about a horizontal axis, rotates each piece of filter paper to the operating stations, arranged one after another and stationary relative to a frame of the machine, to associate to the piece of filtering material a string, suitably wrapped around the piece of filter paper, and a tag in turn connected to the string.

In some machine solutions, depending on the type of filter bag to be formed, there may be (alternatively):
- a station for folding the open ends of the two chambers of the piece along the path of the carousel with their retaining by the knotting of the string on the same piece; or
- a further station for transversal closing of the ends of the piece before or at the same time as the separation from the remaining film.

The machine may also comprise a station for applying a sheet of overwrapping material for each filter bag positioned along the path of the carousel, or at a further carousel.

The machine structured as described above operates intermittently, that is to say, stepwise for all the stations present along the feed line.

The stepwise operation places a limit on the productivity of the machine.

DISCLOSURE OF THE INVENTION

The aim of this invention is to provide a machine for forming filter bags for infusion products with a productivity greater than the productivity of the prior art machines, maintaining a high quality of the filter bag.

More specifically, the aim of this invention to provide a machine for forming filter bags for infusion products with reduced dimensions and high flexibility.

These aims are fully achieved by a machine for forming filter bags for infusion products according to the appended claims.

BRIEF DESCRIPTION OF THE DRAWINGS

The invention will be described with reference to the accompanying drawings, provided by way of example only and without limiting the scope of the invention, in which:

FIG. 1 is a schematic front view, with some parts cut away to better illustrate others, of a machine for forming filter bags for infusion products according to this invention;

FIG. 2 is a perspective view of a piece of filtering material configured at the outlet from a first folding carousel of the machine of FIG. 1;

FIG. 3 is a perspective view, with some parts cut away in order to better illustrate others, of a first transfer wheel of the machine of FIG. 1;

FIG. 4 illustrates a perspective exploded view of the first wheel of FIG. 3;

DETAILED DESCRIPTION OF PREFERRED EMBODIMENTS OF THE INVENTION

Figure 5:
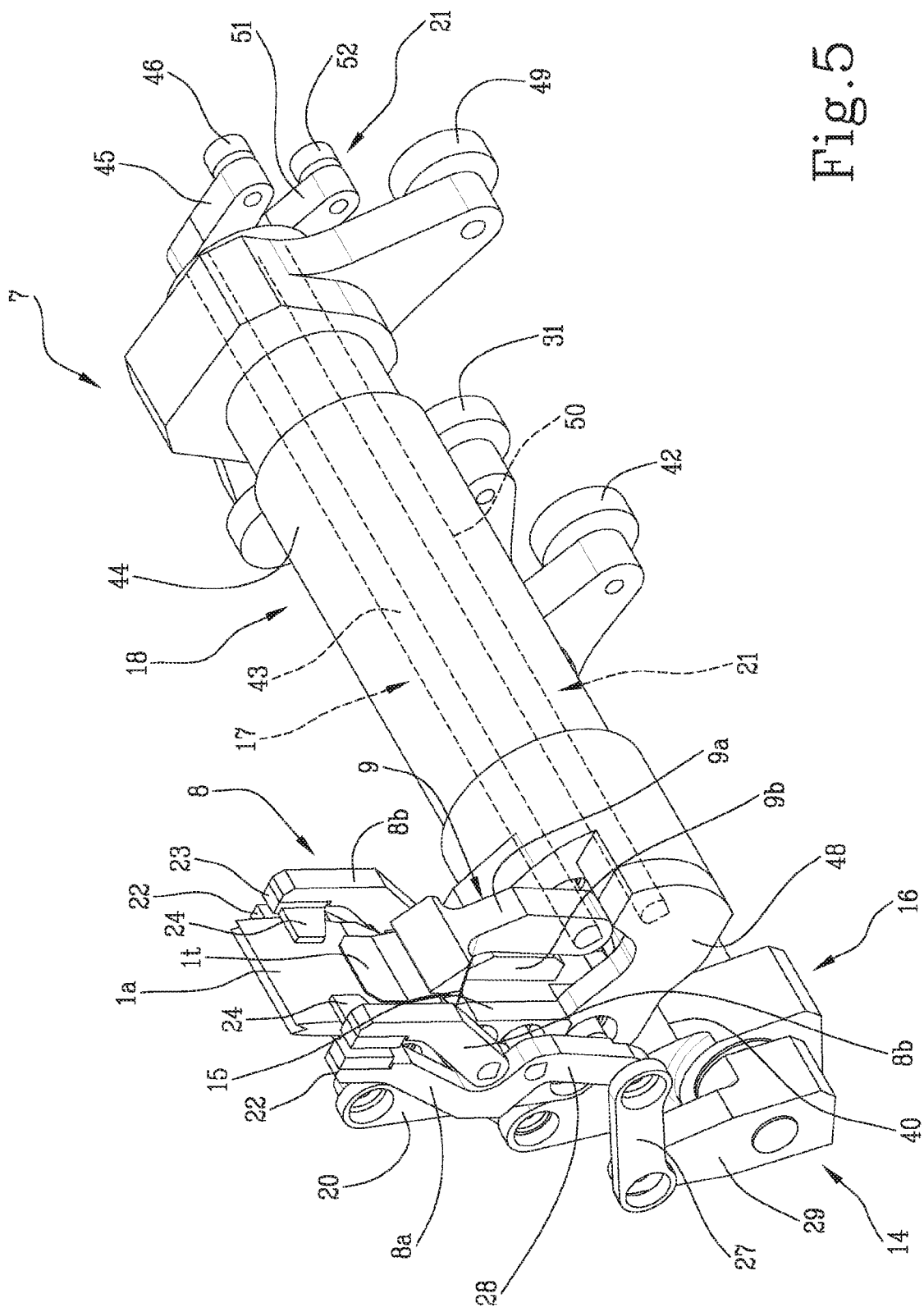
FIGS. 5, 6 and 7 illustrate, respectively, front perspective view, rear perspective view and perspective view from above of a receiving unit forming part of the first transfer wheel of FIG. 4.
Figure 6:
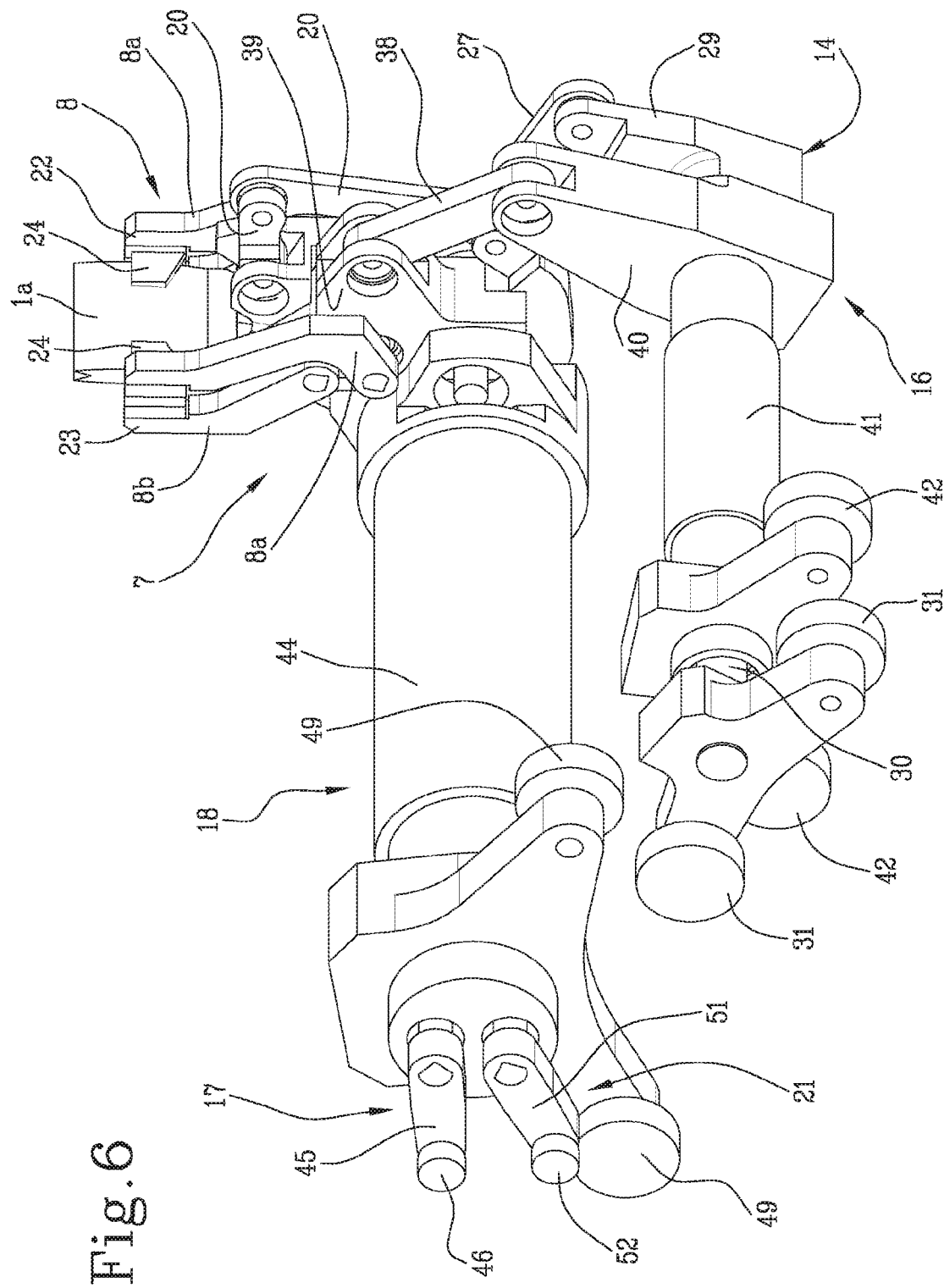

With reference to the accompanying drawings, and in particular to FIG. 1, a machine according to the invention, labelled 100 in its entirety in FIG. 1, is used for forming filter bags containing infusion products, such as tea, coffee, camomile dosed in powder, granular or leaf form.

The expression "filter bags" may refer both to single-chamber filter bags and double-chamber filter bags without thereby limiting the scope of protection of this invention.

The first type of filter bag (single-chamber) comprises a single piece of filtering material having at least two free ends defining, respectively, a head and a bottom between which there is a chamber containing a dose of product.

The second type of filter bag, which for simplicity of description will be referred to in this invention, always comprises a single piece $1a$ of filtering material, which forms two separate chambers $1b$, $1c$. Each chamber $1b$, $1c$ contains a dose of infusion product. The two chambers $1b$, $1c$ are folded towards each other forming a single upper end (in the shape of an upturned "V") and a bottom end in the shape of a "W".

Both types of filter bag (single-chamber or double-chamber) may be equipped with a gripping tag $1t$ and a tie string connecting the tag to the filter bag formed (the string is not illustrated).

An outer overwrapping envelope may also be added to wrap around and enclose each single filter bag formed (the bag is also not illustrated).

Reference will be made below to a double chamber filter bag merely for the purpose of simplifying the description of the machine.

The main aim of the machine 100 according to the invention is to at least form, through a suitable handling, the basic geometrical shape of the filter bag with a double chamber starting from a piece $1a$ of filtering material and folding it and then passing the piece to subsequent stations for the adding to or the completion of the filter bag.

The machine 100 according to the invention is a complex machine with operating stations designed to perform the requested operation on the piece of filtering material or on the filter bag (applying tie string and tag, and/or applying outer overwrapping envelope, etc), whilst maintaining a continuous operation of the machine.

The machine 100 forms filter bags for infusion products starting from pieces $1a$ of filtering material (see FIG. 2) each having two free ends $1d$, $1e$ and an intermediate portion $1f$ (designed to shape the bottom in the form of a "W").

Between each free end $1d$, $1e$ and the intermediate portion $1f$ there are, respectively, two chambers $1b$, $1c$ containing a corresponding dose of product.

Each piece $1a$ is fed along a feed line A.

As illustrated in FIG. 1, the machine 100 comprises a first carousel 2 for continuous rotary movement about a first axis 2X of rotation and with direction V2.

The machine 100 also comprises a plurality of first operating stations 3 (illustrated schematically) positioned along, and movable continuously with, the first movement carousel 2.

Each first station is associated with corresponding gripping elements $3a$ positioned along, and continuously movable with, the first movement carousel 2.

Each pickup unit $3a$ is configured for holding a respective piece $1a$ of filtering material being formed.

Each first operating station 3 is configured to operate on the piece $1a$ of filtering material in order to form, at least partly, a filter bag along at least one predetermined angular stretch of rotation of the first movement carousel 2.

Advantageously, the first operating station 3 acts in conjunction with the corresponding gripping means 3 for retaining the respective piece $1a$ of filtering material being formed.

The machine 100 also comprises a plurality of first translation devices (not illustrated), associated with the first movement carousel 2 and configured for translating, mutually, the first operating stations 3 and the corresponding gripping means $3a$ along a direction parallel to the axis 2X of rotation.

In short, the basic concept of the machine 100 is that it comprises a multiplicity of operating units, all operating a same operation on the piece of filtering material, all independent of each other and driven continuously about an axis of rotation.

This configuration allows an intermediate operation of the filter bag to be obtained on a large number of pieces of filtering material per unit of time and in a reduced space (angular section).

In the case illustrated, pieces of filtering material in a tubular shape are fed to the first movement carousel 2 and the operating stations are folding designed to fold, that is to say, erect, the piece for making a filter bag still without the tie string and tag.

Therefore, each first operating station 3 may be configured to perform intermediate operations on the piece $1a$ of filtering material (in this case folding and erection of the piece).

In the specific case illustrated here, the machine 100 according to the invention is designed for making (as mentioned above) double chamber filter bags starting from a continuous tubular strip of filtering material containing doses of product arranged in succession.

More specifically, the first carousel 2 of the machine 100 illustrated serves to form the two-lobed pieces $1a$ of filtering material and to fold them in the upright form with the ends joined and with the bottom already in the form of a "W".

It should be noted that the first movement carousel 2 rotates continuously in a clockwise direction (direction V2).

As illustrated, each operating station 3 (synchronised with the gripping means and the transfer devices) is configured to retain and operate on a corresponding piece $1a$ of filtering material fed along at least one predetermined angular stretch of rotation of the first movement carousel 2, to obtain at least a lifting of the two chambers $1b$, $1c$ to a position alongside and erect, that is to say, positioned radially relative to the first axis 2X of rotation, and with the corresponding free ends $1d$, $1e$ joined to one another and arranged spaced apart relative to the first carousel 2.

The machine also comprises transfer means 4 designed to transfer the pieces $1a$ of filtering material (folded) from the first movement carousel 2 to a second movement carousel 5 rotating continuously about a second axis 5X Parallel to the first axis 2X of rotation (see FIGS. 1 to 4).

The transfer means 4 comprise a first wheel 6, rotatable continuously about a third axis 6X of rotation parallel to the first 2X and to the second 5X axis of rotation, and actuated in a synchronised fashion with the first 2 and the second 5 movement carousels.

Again as illustrated, the first wheel 6 is equipped (along its circumference) with a plurality of receiving units 7 for receiving from the corresponding first operating stations 3 of the first movement carousel 2, and releasing on the second movement carousel 5, a corresponding piece $1a$ of filtering material being formed after its predetermined arc of rotation.

Each receiving unit 7 is equipped with corresponding first gripping and stabilising means 8 and 13 to retain the piece $1a$ of filtering material upright and positioned with its free ends $1d$, $1e$ (head) joined facing towards the third axis of rotation 6X.

Again as illustrated, the first gripping and stabilising means 8, 13 comprise a unit 8 for the stabilising the piece $1a$ of filtering material in an upright position when receiving of the piece $1a$ of filtering material.

The first stabilising means 8 of each receiving unit 7 comprises a first gripper consisting of two fork-shaped claws 8a, 8b for retaining the piece 1a of filtering material and articulated on the receiving unit 7.

Each first gripper is connected to a first control device 14 configured for rotating the two claws 8a, 8b between an open operating position for gripping or releasing the piece 1a of filtering material, wherein the two claws 8a, 8b are spaced apart from each other, and a closed operating position for retaining the piece 1a of filtering material, wherein the two claws 8a, 8b are moved towards each other.

Figure 7:
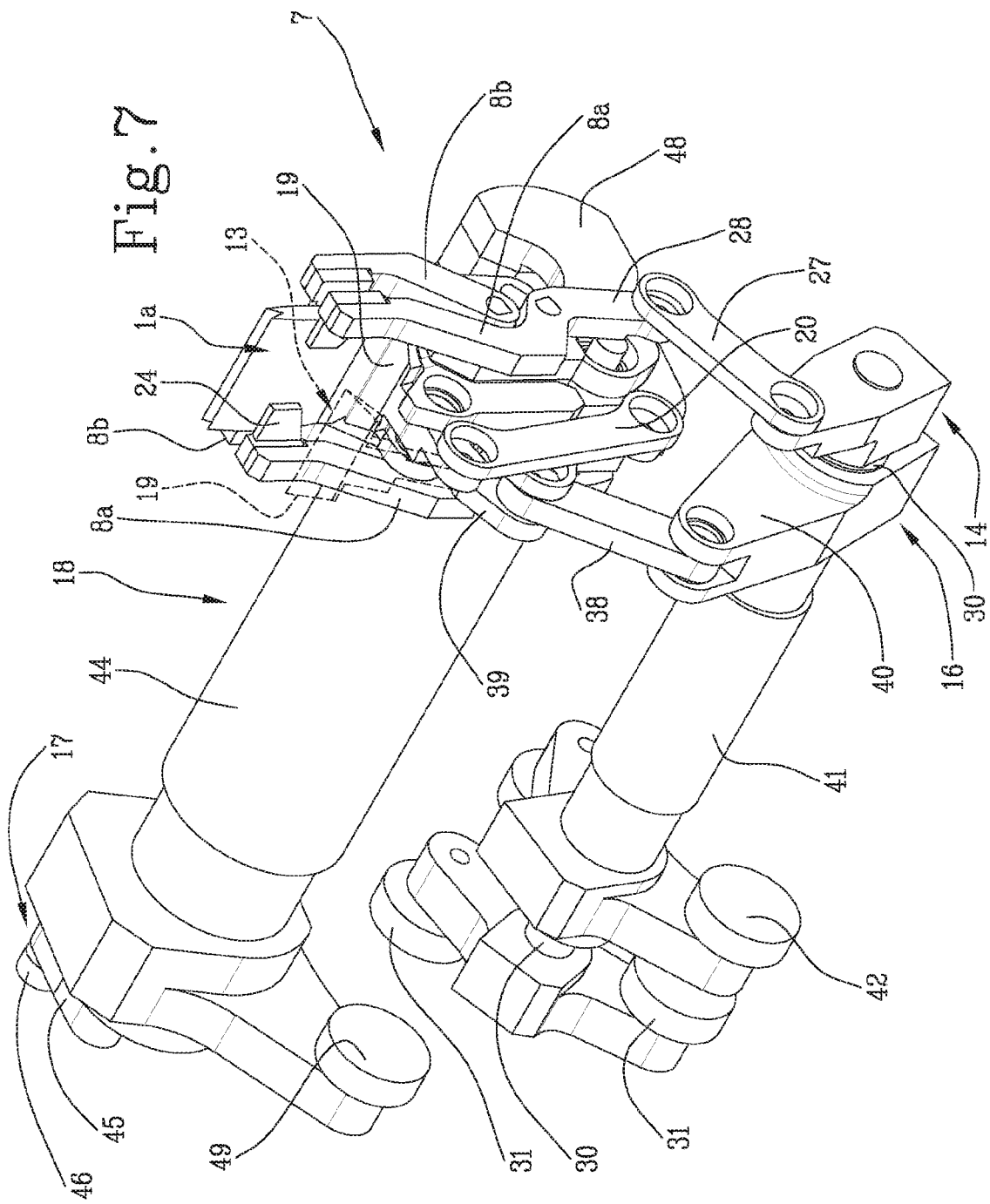

It should be noted that each receiving unit 7 comprises the corresponding first gripping and stabilising means divided into two separate components: an element 13 for gripping the piece 1a of filtering material for retaining the joined head ends 1d, 1e, and the above-mentioned stabilising means 8 for keeping in an upright position the piece 1a of filtering material retained by the joined free head ends 1d, 1e at the receiving of the piece 1a of filtering material. (see also in particular FIG. 7).

As mentioned above (see in particular FIGS. 5 to 8), each stabilising means 8 of each receiving unit 7 comprises a first gripper consisting of two fork-shaped claws 8a, 8b for retaining the piece 1a of filtering material, which are articulated on the receiving unit 7.

Figure 10:
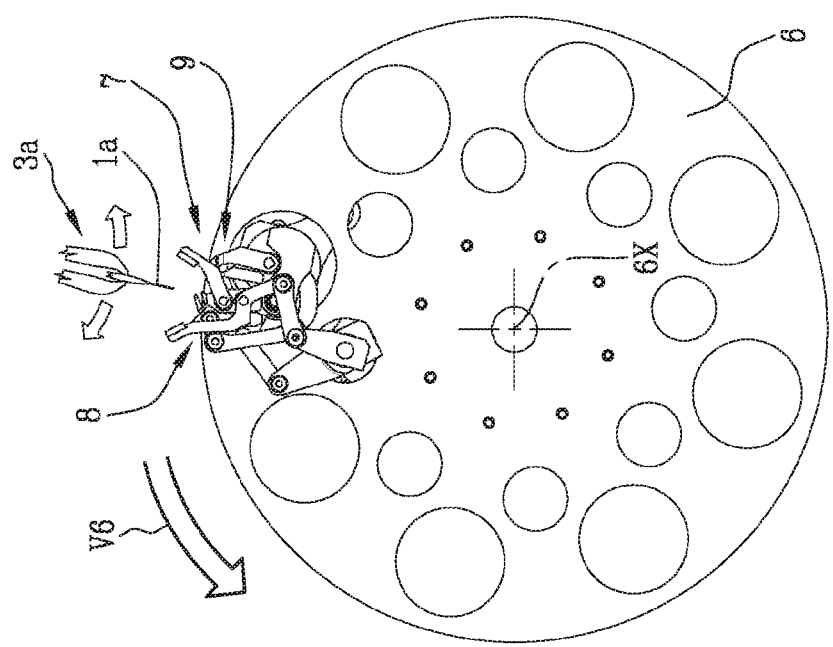

In light of this, each first gripper is connected to a first control device 14 configured for rotating the two claws 8a, 8b between an open operating position for gripping or releasing the piece 1a of filtering material, wherein the two claws 8a, 8b are spaced apart from each other (see FIGS. 10 and 15), and a closed operating position for retaining the piece 1a of filtering material, wherein the two claws 8a, 8b are moved towards each other (see FIGS. 11-14).

Figure 13:
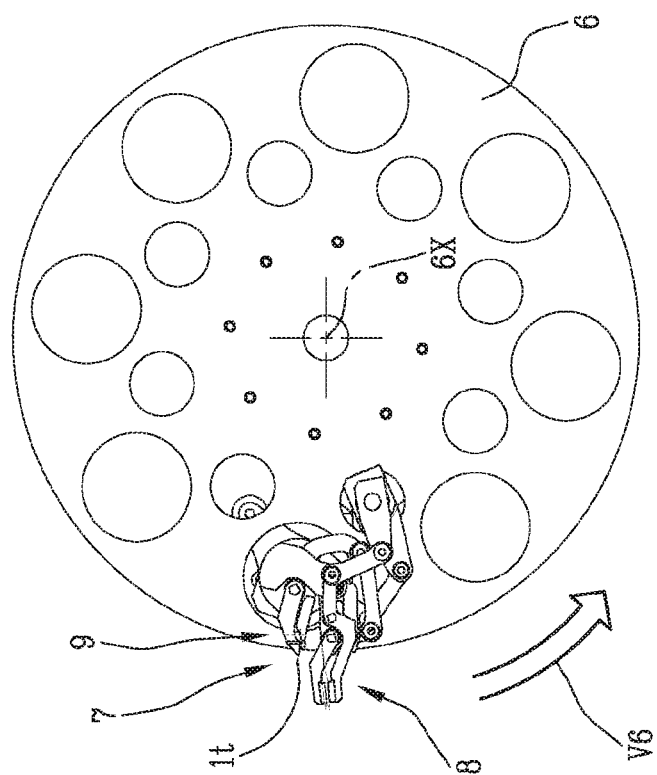
Figure 12:
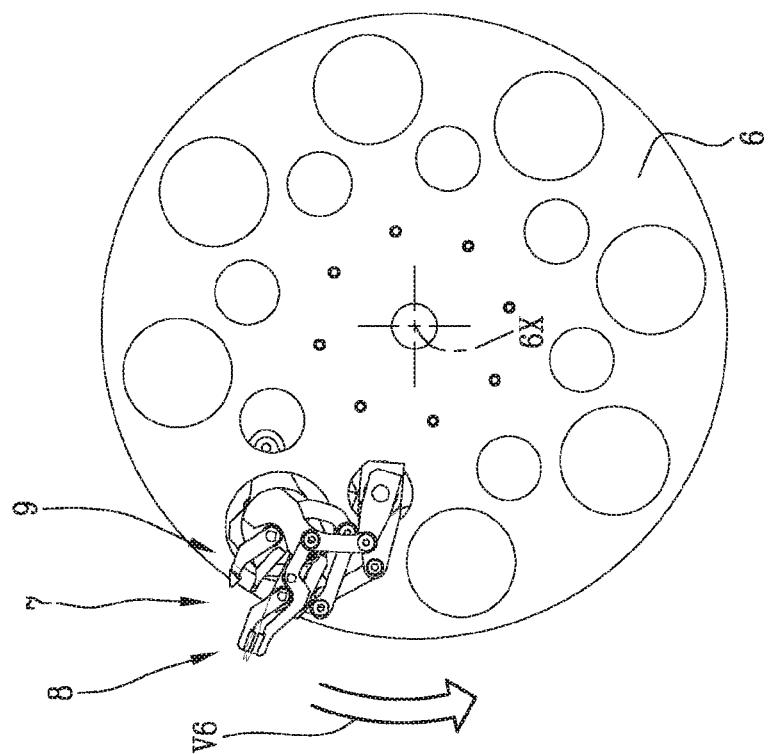
Figure 14:
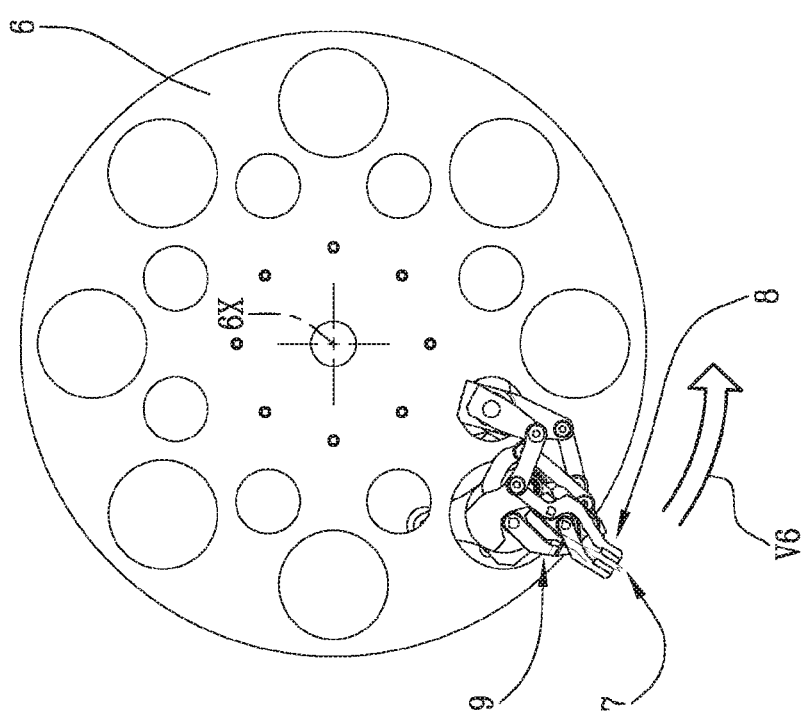

Preferably, each receiving unit 7 comprises a base 15 for supporting the first gripper connected to a second control device 16 configured for moving the supporting base 15 tangentially in both directions relative to the third axis 6X of rotation between a first advanced position (with a radial movement relative to the third axis 6X of rotation), where the supporting base 15 is away from the third axis 6x of rotation, at least at:
  the passage of the piece 1a of filtering material from the first movement carousel 2 to the receiving unit 7 (FIGS. 10 and 11);
  the picking up of the tag 1t (FIG. 13); and
  the release of the piece 1a of filtering material with the tag 1t (positioned alongside) to the second movement carousel 5 (FIG. 15), and a withdrawn position, wherein the supporting base 15 is moved close to the third axis of rotation 6X at the intermediate transits of the receiving unit 7 between the above-mentioned pick-up and release positions (FIG. 14).

Each receiving unit 7 has second gripping means 9 for positioning and retaining a tag 1t on the piece 1a of filtering material, fed by a corresponding feeding station 10, in such a way as to release to the second carousel 5 the piece 1a of filtering material with a corresponding tag 1t placed alongside the joined free ends 1d, 1e of the piece 1a of filtering material.

Figure 9:
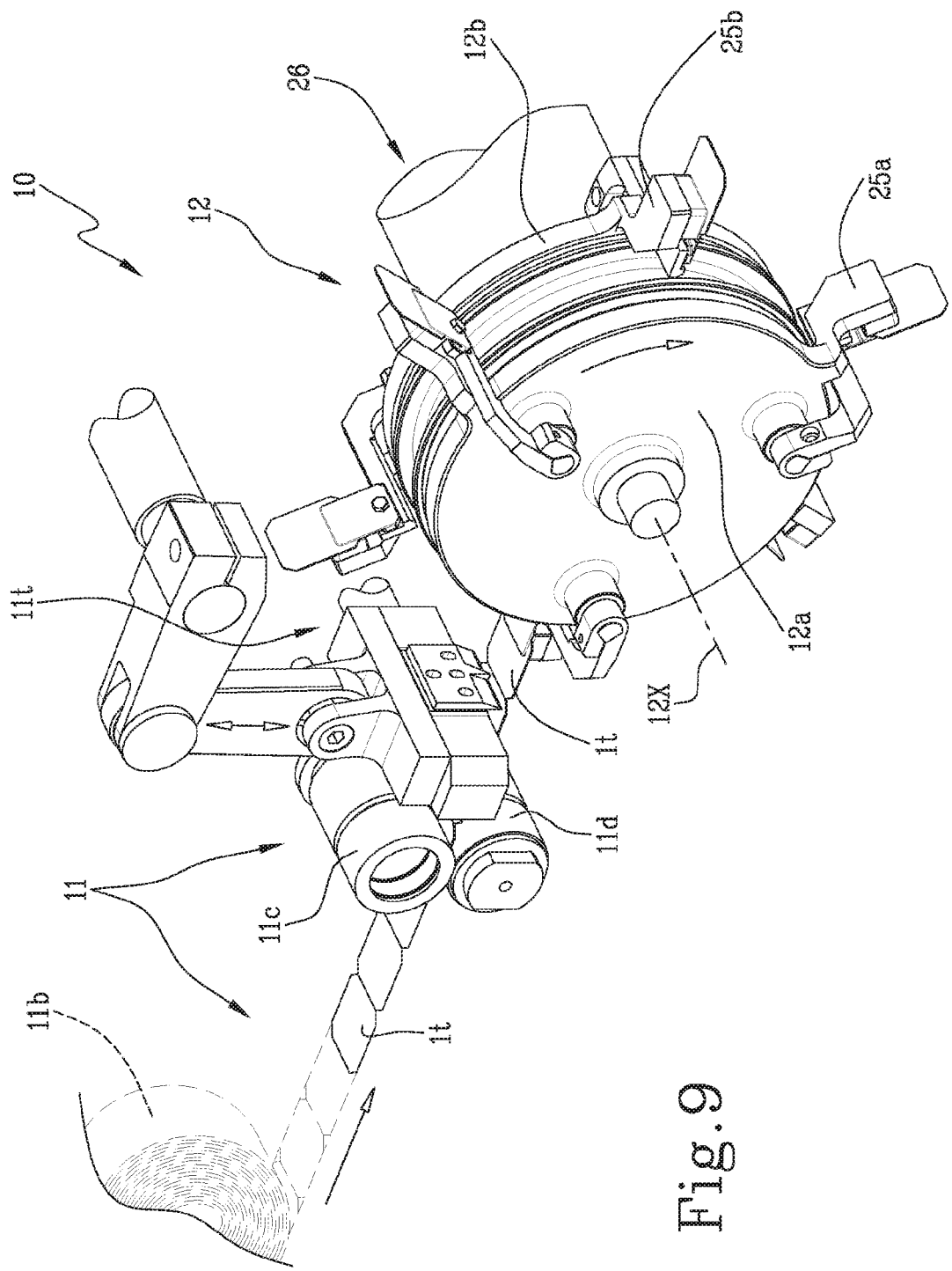
FIG. 9 illustrates a perspective view, with some parts cut away, of a station for feeding a tag to the first transfer wheel forming part of the machine of FIG. 1.

Preferably (see FIG. 9), the station 10 for feeding the tags 1t has means 11 of unwinding and separating the tags 1t and a device 12 for picking up the individual tags 1t (from the means 11) and for feeding the individual tags 1t to the receiving units 7 in transit.

Preferably, the second means 9 for gripping an individual tag 1t, independent of the first gripping and stabilising means 8, 13, are configured for picking up and positioning the individual tag 1t in contact with the joined free ends 1d and 1e of the piece 1a of filtering material at least prior to the passage of the piece 1a of filtering material with the tag 1t to the second movement carousel 5.

Preferably, the second gripping means 9 comprise a second gripper for gripping the tag 1t consisting of two claws 9a, 9b articulated on the receiving unit 7.

It should be noted that the second gripper is positioned upstream relative to the first gripper with reference to a direction V6 of rotation of the first wheel 6 (in this case anticlockwise).

In light of this, the second gripper is connected to a third control device 17 configured for moving at least one claw 9a or 9b relative to the other claw 9b or 9a between an open operating position for the gripping or releasing of the tag 1t (see FIGS. 12 and 15), wherein the two claws 9a, 9b are spaced far apart, and a closed operating position for retaining the tag 1t, wherein the two claws 9a, 9b are close together (see FIGS. 13 and 14).

It should also be noted that the second gripper is connected to a fourth control device 18, in a synchronised fashion with the second control device 16 and the third control device 17 (as described in detail below), configured at least for rotating the two claws 9a, 9b between a first standby position (FIGS. 10 and 13), wherein the two claws 9a, 9b are spaced apart from the first gripper, and a second operating position (FIGS. 14 and 15), wherein the two claws 9a, 9b are moved towards the first gripper for bringing the tag 1t alongside the piece 1a of filtering material.

Preferably, the gipping means 13 (see FIG. 7) comprise a third gripper 19 articulated on the receiving unit 7 downstream of the first gripper with reference to the direction V6 of rotation of the first wheel 6.

In light of this, the third gripper 19 is connected to a kinematic unit 20 of levers articulated on the receiving unit 7 and connected to a fifth control device 21 configured for rotating the third gripper 19 between a first non-operating position (dashed line in FIG. 7), wherein the third gripper 19 is moved away from the first gripper, and a second operating position (continuous line in FIG. 7), wherein the third gripper 19 is moved close to the first gripper and in contact with the joined free head ends 1d and 1e of the piece 1a of filtering material with contact on a portion of the bottom 15.

It should be noted, as shown in FIG. 2, that in the case illustrated for this type of solution the piece 1a of filtering material is picked up by the first wheel 6 with the ends 1d, 1e facing towards the centre of the piece 1a to form a fold obtained in two successive steps during the path carried by the first wheel and by means of folding means not illustrated.

According to a preferred solution, the fork-shaped claws 8a, 8b of the first gripper have corresponding pairs of end heads 22, 23 each having a transversal tab 24 for retaining the lateral edges of the piece 1a of filtering material and configured for defining a free central zone from the bottom 1f to the joined head ends 1 and 1e of the piece 1a of filtering material.

Figure 15:
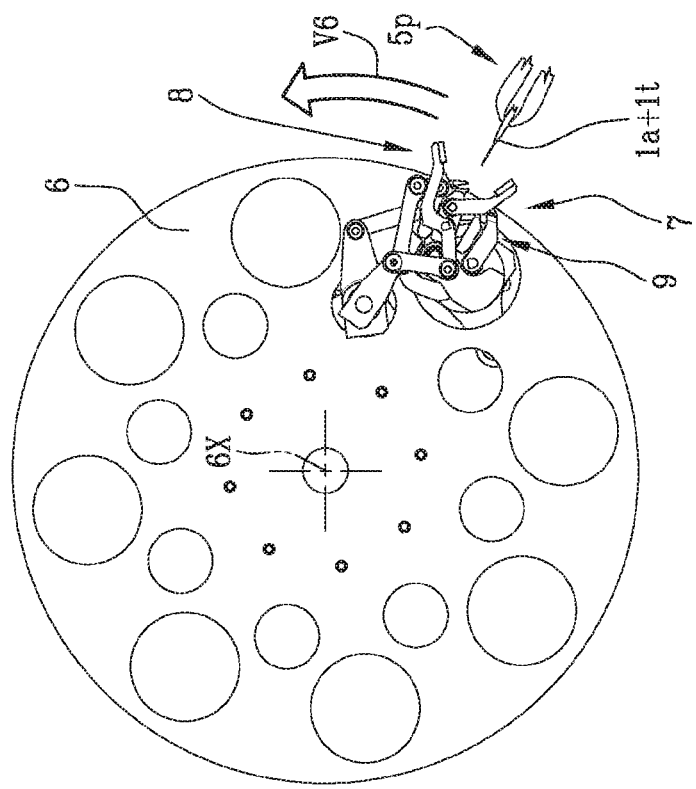

This architecture of the claws 8a, 8b makes it possible to retain and stabilise correctly the piece 1a of filtering material and, at the same time, define a free zone both for the placing the tag 1t alongside the piece 1a and for gripping the piece 1a with the tag by a corresponding station 5a of the second carousel 5. FIG. 15 illustrates, only by way of non-limiting example, a gripper 5p of one of the stations 5a of the second carousel 5 for gripping and positioning the piece 1a with the tag 1t in the relative operating station 5a.

In other words, the second movement carousel 5 is substantially alongside the first transfer wheel 6.

The second carousel comprises a plurality of grippers 5p positioned along, and movable continuously with, the second movement carousel 5.

Each gripper 5p is configured to receive and retain a piece 1a of filtering material with tag 1t being formed.

Each gripper 5p is linked to a corresponding operating station 5a positioned along, and movable continuously with, the second movement carousel 5.

Each operating station 5a is configured to operate on the piece 1a of filtering material with the tag 1t in order to further form, at least partly, a filter bag along at least one predetermined angular stretch of rotation of the second movement carousel 5 which, in this case may be the application of a tie string (not illustrated) to the joined ends 1d and 1e and to the tag 1t.

It should be noted that the first carousel 2 and the second carousel 5 have corresponding directions V2, V5 of rotation concordant with each other (clockwise direction), whilst the first transfer wheel 6 has a direction V6 of rotation opposite to the directions V2, V5 of rotation of the two carousels 2, 5 (anticlockwise direction).

More in detail of the functional components of each receiving unit 7, the first device 14 for controlling the first stabilising means 8 comprises (FIGS. 5 to 8):
- a first connecting rod 27 articulated to a flange extension 28 of the first claw 8a;
- a first lever 29 articulated at the other end of the first connecting rod 27;
- a first shaft 30 for transmitting the motion on which is articulated the first lever 29; the first shaft 30 is rotatably housed inside the first wheel 6 with its axis of extension parallel to the third axis 6X; the first shaft 30 has a series of cam follower rollers 31, located on its innermost end, and positioned in contact with a cam profile made on the inner part of the first wheel 6.

It should be noted that the cam profiles which are referred to in the description and which are present in the first wheel 6 are not indicated in detail, but each of them is configured, in terms of the profile, for implementing the illustrated movements of each control device described in this invention.

It should be noted that the first control device 14 is connected to a single claw, 8a, therefore in order to obtain a coordinated movement between the two claws 8a, 8b there is a kinematic system positioned inside the supporting base 15 of the receiving unit 7.

The kinematic system (see FIG. 8) comprises two pins 32 and 33 keyed to the corresponding claws 8a, 8b in such a way as to define the articulation points on the receiving unit 7. Each pin 32 and 33 has a zone with greater thickness 34 and 35 on which there is a toothed sector 36 and 37 meshed with the toothed sector 37 and 36 from the other zone 34 and 35.

Thanks to this kinematic connection, the rotary movement actuated by the first claw 8a, on the command of the first control device 14 described above, is transmitted, with inverted directions of movement, to the second claw 8b in such a way as to allow the moving away or towards each other of the two claws 8a and 8b.

The second control device 16 (FIGS. 5 to 8) of the supporting base 15, which, as described in more detail below, is directly correlated in the movement of the receiving unit 7 with the fourth control device 18, comprises:
- a second connecting rod 38 articulated to a flange 39 of the support base 15;
- a second lever 40 articulated at the other end of the second connecting rod 38;
- a second shaft 41 for transmitting the motion on which is articulated the second lever 40; the second shaft 41 is rotatably housed inside the first wheel 6 with its axis of extension parallel to the third axis 6X; the second shaft 41 is coaxially positioned on the first shaft 30 and its axis coincides with the axis of the first shaft 30.

The second shaft 41 has a series of cam follower rollers 42, located on its innermost end and positioned in contact with a corresponding cam profile made on the inner part of the first wheel 6 to allow the tangential movement in both directions of the supporting base 15.

The third control device 17 (FIGS. 5-8) of the second gripping means 9 comprises a third shaft 43 for transmitting the motion on which is articulated a claw 9a of the second gripping means 9.

The third shaft 43 is rotatably housed inside a fourth shaft 44 for transmitting the motion (which forms part of the fourth control device 18) and both are positioned inside the first wheel 6 with the axis of extension parallel to the third axis 6X.

The third shaft 43 protrudes from the fourth shaft 44 and is equipped with a link-rod 45 equipped with a cam follower roller 46 designed to follow a front cam profile present on the first wheel 6 to allow a rotation of the claw 9a towards and away from the other claw 9b.

The second claw 9b of the second gripping means 9 is associated stably with the fourth control device 18 which interacts with the second 16 and third 17 control device.

The fourth control device 18 (FIGS. 5-8) comprises the above-mentioned fourth shaft 44 for transmitting the motion (inside of which is housed, freely rotatable, the third shaft 43) comprising at the outer end a relative front portion configured in the form of a cradle and defined also by a cover 48 integral with the fourth shaft 44 and carrying the centre of rotation of the supporting base 15.

On the front portion of the fourth shaft 44 is associated the second claw 9b of the second gripping means 9.

The fourth shaft 44 has on its inner end housed in the first wheel 6 cam follower rollers 49 in contact with a corresponding cam profile so as to rotate about its axis and allow the movement towards and away from the claws 9a, 9b of the second gripping means 9 of the first gripping means 8. These movements are coordinated and in phase with the lifting and lowering movement of the support base 15 also by means of the second control device 16.

The fifth control device 21 of the stabilising element 13 comprises:
- the above-mentioned kinematic unit of levers 20 configured to connect the gripper 19 (positioned in front of the piece 1a of filtering material and upstream of the first gripping means 8 relative to the direction V6 of rotation of the first wheel 6) to a fifth shaft 50 for transmitting the motion positioned downstream of the first gripping means 8 again relative to the direction V6 of rotation of the first wheel 6.

The fifth shaft 50 is housed, freely rotatable, inside the fourth shaft 44 and parallel to the third shaft 43.

The fifth shaft 50 protrudes from the fourth shaft 44 and is provided with a link-rod 51 equipped with a cam follower roller 52 designed to follow a front cam profile present on the first wheel 6 to allow the movement from the first non-operating position (a dashed line in FIG. 7), wherein the third gripper 19 is moved away from the first gripper, and a second operating position (continuous line of FIG. 7), wherein the third gripper 19 is moved close to the first gripper and in contact with the joined free ends 1d and 1e of the piece 1a of filtering material.

This movement is in phase with the movement of the second, third and fourth shaft for transmitting the motion.

Preferably, (FIGS. 1 and 9), the above-mentioned device 12 for picking up the individual tags 1*t* and for feeding the individual tags 1*t* to the receiving units 7 in transit is configured for feeding the tags 1*t* according to a direction radial to the first transfer wheel 6.

In light of this, the device 12 for picking up the individual tags 1*t* and for feeding the individual tags 1*t* is positioned alongside the first wheel 6 and in a position in the path of the first wheel 6 between the pick-up zone of the piece 1*a* of filtering material from the first movement carousel 2 and the release zone of the piece 1*a* of filtering material with the tag 1*t* to the second movement carousel 5.

In an alternative embodiment (not illustrated), the device 12 for picking up the individual tags 1*t* and for feeding the individual tags 1*t* is again positioned alongside the first wheel 6, but in a position in the path of the first wheel 6 between the zone for releasing the piece 1*a* of filtering material with the tag 1*t* to the second movement carousel 5 and the zone for picking up the piece 1*a* of filtering material from the first movement carousel 2. In other words, the tag 1*t* could be fed to the receiving unit 7 before picking up the piece 1*a* of filtering material from the first movement carousel 2. It should be noted that the above-mentioned means 11 for unwinding the tags 1*t* comprise a reel 11*b* of tags 1*t* in a continuous strip which is fed towards the device 12 for feeding the individual tags 1*t* from a pair of motor-driven rollers 11*c*, 11*d*.

Between the pair of rollers 11*c* and 11*d* and the device 12 there is a cutting unit 11*t* designed for separating the individual tags 1*t* before their picking up.

The movement of the pair of rollers 11*c* and 11*d* and of the cutting unit 11*t* is of the alternating type.

Preferably, the pick-up device 12 comprises two independent drums 12*a* and 12*b* side by side and rotating about a fourth axis 12X of rotation which is shared and parallel to the third axis 6X of rotation of the first transfer wheel 6.

Each drum 12*a*, 12*b* has a plurality of grippers 25*a*, 25*b* for picking up and transporting a corresponding single tag 17 from the unwinding and separating means 11 to the first transfer wheel 6.

Each gripper 25*a* or 25*b* is configured in the shape of an "I" in such a way as to position itself along a circular trajectory shared between the two drums 12*a* and 12*b* coinciding with the points for picking up and releasing the tags 1*t*.

Each drum 12*a*, 12*b* is moved, in a discontinuous manner, by movement means 26 configured to allow an alternating rotation of the drums 12*a*, 12*b* in such a way as to position the corresponding grippers 25*a*, 25*b* of each drum 12*a*, 12*b* with a reciprocal angular displacement, between preceding and successive grippers 25*a*, 25*b*, so as to constantly maintain a gripper 25*a*, 25*b* with the tag 1*t* of one of the drums 12*a*, 12*b* in the proximity of the corresponding receiving units 7 in transit with continuous movement.

In short, each receiving unit 7 operates during the continuous rotation of the first wheel 6 in the manner illustrated in FIGS. 10 to 15.

The receiving unit 7 arrives in the proximity of the first carousel 2 (approximately at 12 o'clock position—FIG. 10) and with a radial lifting movement of the first gripper in the open position picks up the piece 1*a* of filtering material from a corresponding first station 3 of the first carousel 2, closing on the same piece 1*a*.

Figure 11:
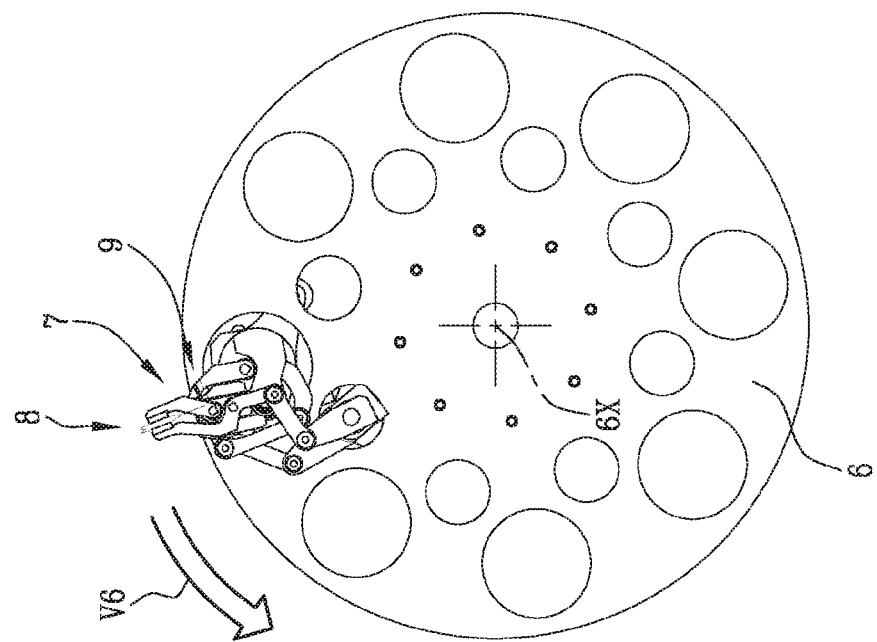
FIGS. 10 to 15 illustrate front views, with some parts schematic and others cut away, of corresponding operating positions of a receiving unit of the first wheel.

Subsequently, whilst the first wheel 6 continuous its rotation, the first closed gripper is lowered whilst the third gripper 19 rotates so as to lock and stabilise the piece 1*a* (FIGS. 11-11 o'clock position).

Subsequently (FIGS. 12-10 o'clock position), the first gripper starts a new lifting whilst the second gripper is brought to the open position and away from the first gripper.

At the intercepting of the feed drums 12*a* and 12*b* the second gripper picks up a tag 1*t* from a gripper 25*a* or 25*b* of a drum 12*a* or 12*b*.

Figure 8:
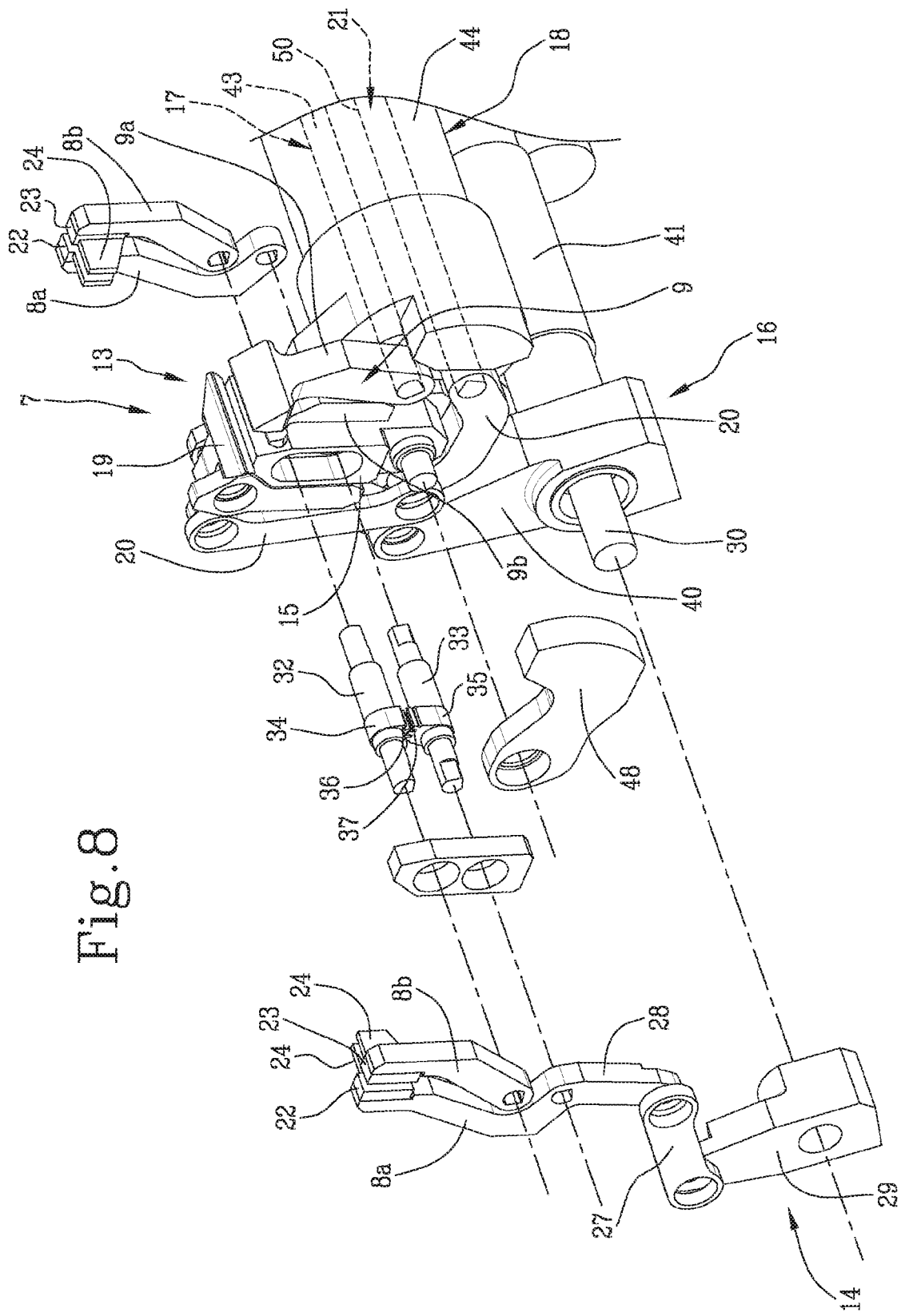
FIG. 8 illustrates a perspective view, with some parts exploded to illustrate others, of a front part of the receiving unit.

After this operation, the first gripper with the piece 1*a* is lowered whilst the second gripper with the tag 1*t* is brought into contact with the piece 1*a* (FIGS. 14-8 o'clock position).

At this point the receiving unit 7, arriving in the proximity of the release zone of the piece 1*a* with the tag 1*t*, prepares to raise the first gripper with consequent opening of the first gripper 8, the third gripper 19, and the second gripper at the intercepting of a gripper 5*p* of the second carousel 5 (FIGS. 15-5 o'clock position).

The preset aims are fully achieved with the machine structure just described.

In effect, a machine according to the invention is extremely flexible, configurable as a function of the filter bag to be made, and with a high productivity.

It should be noted that each individual operation on the piece of filtering material, or on the filter bag, is no longer linked to the pause time (as in the machines with step-mode operation) and has a duration independent from one another. It is therefore possible to lengthen or shorten, as necessary, the time of execution of an operation (in this case, for example, preparing the piece of filtering material with free ends closed with a tag already positioned) simply by using a longer or shorter stretch of rotation of the movement carousel.

Each unit may operate on the piece of filtering material along an extremely short arcuate stretch of the carousel and with the possibility of starting the operations immediately, reducing the down times and the dimensions of the machine.

The invention claimed is:

1. A machine for making filter bags for infusion products starting from pieces of filtering material each including two free ends, respectively forming a head and a base of the piece of filtering material with interposed at least one chamber containing a dose of product; the pieces of filtering material advancing along a feed line, the machine comprising at least:

a first movement carousel for continuous rotary movement about a first axis of rotation and having at least a plurality of operating stations positioned along, and continuously movable with, the first movement carousel, each operating station being configured to retain and operate on a piece of the pieces of filtering material fed along at least one predetermined angular stretch of rotation of the first movement carousel, to obtain at least a lifting of the at least one chamber to an upright position;

a second movement carousel for continuous rotary movement about a second axis, parallel to the first axis of rotation;

a transfer wheel configured to transfer the pieces of filtering material from the first movement carousel to the second movement carousel; wherein the transfer wheel is rotatable continuously about a third axis of rotation parallel to the first and to the second axis of rotation in a synchronized fashion with the first movement carousel and the second movement carousel; the transfer wheel comprising a plurality of receiving units positioned along, and able to move continuously with the transfer wheel for receiving from the corresponding operating stations of the first movement carousel, and releasing on the second movement carousel, a corresponding piece of filtering material being formed after a predetermined arc of rotation;

each receiving unit comprises a gripper comprising two fork-shaped claws configured for retaining the piece of filtering material in an upright position with the head oriented towards the third axis of rotation; each gripper being configured to rotate between an open operating position for picking up or releasing the piece of filtering material, where the two fork-shaped claws are spaced apart from each other, and a closed operating position for retaining the piece of filtering material, where the two fork-shaped claws are close to each other, wherein the two fork-shaped claws of the gripper have corresponding pairs of end heads, each head having a transversal tab for retaining a respective lateral edge of the piece of filtering material and configured for defining a free central zone between the base and the head of the piece of filtering material.

2. The machine according to claim 1, wherein each receiving unit comprises a supporting base for supporting the two fork-shaped claws, the supporting base being movable between a first advanced position, where the supporting base is away from the third axis of rotation, at least when the piece of filtering material passes from the first movement carousel to the receiving unit, and a backward position, in which the supporting base is closer to the third axis of rotation when the two fork-shaped claws are between the operating position for picking up the piece of filtering material and the operating position for releasing the piece of filtering material.

3. The machine according to claim 1, further comprising a tag feeding station and wherein each receiving unit has a tag gripper for positioning and retaining a tag on the piece of filtering material, fed by the tag feeding station, in such a way as to release to the second movement carousel the piece of filtering material with a corresponding tag placed alongside the head of the piece of filtering material.

4. The machine according to claim 3, wherein the tag gripper is independent from the first gripper and is configured for picking up and positioning the tag in contact with the head of the piece of filtering material at least before passage of the piece of filtering material with the tag to the second movement carousel.

5. The machine according to claim 3, wherein the tag gripper comprises two claws articulated on the receiving unit; the tag gripper being positioned close to the gripper; at least one of the two claws of the tag gripper being movable relative to the other claw of the tag gripper between an open operating position for picking up or releasing the tag, wherein the two claws of the tag gripper are spaced apart, and a closed operating position for retaining the tag, wherein the two claws of the tag gripper are positioned together.

6. The machine according to claim 3, wherein the tag feeding station includes an unwinding and separating device including feed roller and a cutting blade for unwinding and separating the tags and a pick-up device including a plurality of the tag grippers mounted on a rotary drum for picking up the individual tags and for feeding the individual tags to the receiving units in transit.

7. The machine according to claim 6, wherein the pick-up device is configured for feeding the tags according to a direction radial to the transfer wheel; the pick-up device being positioned at a zone alongside a path of the transfer wheel between a pick-up zone of the piece of filtering material from the first movement carousel and a release zone where the piece of filtering material with the tag is released to the second movement carousel.

8. The machine according to claim 6, wherein the pick-up device comprises two independent drums placed side by side and rotating about a fourth axis of rotation shared with and parallel to the third axis of rotation of the transfer wheel; each drum having a plurality of the tag grippers for picking up and transporting a corresponding individual tag from the unwinding and separating device to the transfer wheel; each drum being moved, in a discontinuous manner, by a motor configured to allow an alternating rotation of the drums in such a way as to position the corresponding tag grippers of each drum with a reciprocal angular displacement between preceding and successive tag grippers so as to constantly maintain a tag gripper of one of the drums in the proximity of the corresponding receiving units in transit with continuous movement.

9. The machine according to claim 1, wherein the first movement carousel and the second movement carousel have directions of rotation concordant with each other and the transfer wheel has a direction of rotation opposite to the directions of rotation of the first and second movement carousels.

10. The machine according to claim 1, and further comprising a further gripper for gripping and retaining in position the head of the piece of filtering material.

11. The machine according to claim 10, wherein the further gripper is articulated by a kinematic unit of levers on the receiving unit and configured to rotate between a first non-operating position, wherein the further gripper is away from the gripper, and a second operating position, wherein the further gripper is moved close to the gripper and in contact with the head of the piece of filtering material.

12. A machine for making filter bags for infusion products starting from pieces of filtering material each including two free ends, respectively forming a head and a base of the piece of filtering material with interposed at least one chamber containing a dose of product; the pieces of filtering material advancing along a feed line, the machine comprising at least:

a first carousel rotating about a first axis of rotation and having at least a plurality of operating stations arranged circumferentially on the first carousel;

a second carousel rotating about a second axis of rotation, parallel to the first axis of rotation;

a transfer wheel configured to transfer the pieces of filtering material from the first carousel to the second carousel; wherein the transfer wheel is rotatable continuously about a third axis of rotation and is actuated in a synchronized fashion with the first and the second carousel; the transfer wheel comprising a plurality of receiving units positioned circumferentially on the transfer wheel for transferring a piece of filtering material from the first carousel to the second carousel;

a tag feeding station for feeding tags having an unwinding and separating device for unwinding and separating the tags, and a pick-up device for picking up the tags individually and for feeding each tag to the receiving unit in transit, wherein each receiving unit has a gripper for positioning and retaining a tag on the piece of filtering material, in such a way as to release to the second carousel the piece of filtering material with a corresponding tag placed alongside the head of the piece of filtering material, wherein the pick-up device comprises two independent drums side by side and rotating about a fourth axis of shared rotation; each drum having a plurality of tag grippers for picking up and transporting a corresponding tag from the unwinding and separating device to the transfer wheel; each drum being moved, in a discontinuous manner, by a motor configured to allow an alternating rotation of the drums in such a way as to position the corresponding tag grippers of each drum with a reciprocal angular displacement between preceding and successive tag grippers, so as to constantly maintain a tag gripper with the tag of one of the drums in proximity of the corresponding receiving units in transit with continuous movement.

13. The machine according to claim 12, wherein each operating station is configured to retain and operate on a corresponding piece of filtering material fed along at least one predetermined angular stretch of rotation of the first carousel, to obtain at least one lifting of the at least one chamber of the piece of filtering material in a an upright position.

14. The machine according to claim 12, wherein the first, second, third and fourth axis of rotation are parallel to each other.

15. The machine according to claim 12, wherein the pick-up device is configured for feeding the tags according to a direction radial to the transfer wheel; the pick-up device being positioned alongside the transfer wheel and in a position in a path of the transfer wheel between a pick-up zone of the piece of filtering material from the first carousel and a release zone of the piece of filtering material with the tag to the second carousel.

* * * * *